United States Patent
Ruddy et al.

(10) Patent No.: US 10,576,924 B2
(45) Date of Patent: Mar. 3, 2020

(54) VEHICLE AIRBAG APPARATUS

(71) Applicant: TOYODA GOSEI CO., LTD., Kiyosu-shi, Aichi-ken (JP)

(72) Inventors: John Ruddy, Plymouth, MI (US); Brandon Streeter, Plymouth, MI (US); Akira Yamashita, Plymouth, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 37 days.

(21) Appl. No.: 16/050,280

(22) Filed: Jul. 31, 2018

(65) Prior Publication Data
US 2020/0039461 A1  Feb. 6, 2020

(51) Int. Cl.
| | |
|---|---|
| B60R 21/205 | (2011.01) |
| B60R 21/231 | (2011.01) |
| B60R 21/2338 | (2011.01) |
| B60R 21/235 | (2006.01) |
| B60R 21/233 | (2006.01) |

(52) U.S. Cl.
CPC .......... B60R 21/205 (2013.01); B60R 21/231 (2013.01); B60R 21/233 (2013.01); *B60R 2021/23308* (2013.01); *B60R 2021/23324* (2013.01); *B60R 2021/23382* (2013.01); *B60R 2021/23509* (2013.01); *B60R 2021/23538* (2013.01)

(58) Field of Classification Search
USPC ...................................................... 280/730.1
See application file for complete search history.

(56) References Cited

U.S. PATENT DOCUMENTS

| | | | | |
|---|---|---|---|---|
| 6,962,363 | B2 * | 11/2005 | Wang | B60R 21/233 280/729 |
| 7,798,520 | B2 * | 9/2010 | Feller | B60R 21/23138 280/729 |
| 2003/0218325 | A1 * | 11/2003 | Hasebe | B60R 21/233 280/743.2 |
| 2004/0145161 | A1 * | 7/2004 | Hasebe | B60R 21/233 280/729 |

(Continued)

FOREIGN PATENT DOCUMENTS

| | | |
|---|---|---|
| JP | 2006-327505 A | 12/2006 |
| JP | 2008-254500 A | 10/2008 |

(Continued)

*Primary Examiner* — Paul N Dickson
*Assistant Examiner* — Hilary L Johns
(74) *Attorney, Agent, or Firm* — Posz Law Group, PLC

(57) ABSTRACT

An airbag is installed in a storage section of an instrument panel. The airbag includes a bag body, a part of which is constituted by a peripheral wall panel section. The peripheral wall panel section includes a pair of panels arranged in the vehicle width direction. At least one of the panels includes an assembled panel, in which adjacent fabric pieces are joined by a peripheral edge joint section. The assembled panel includes a support inflation section, which, when the bag body is deployed and inflated, projects outward of the bag body further than the other sections of the assembled panel so as to be in contact with the instrument panel. The support inflation section is constituted by a part of the peripheral edge joint section and a part of each of the two fabric pieces that are joined by the peripheral edge joint section.

4 Claims, 10 Drawing Sheets

(56) References Cited

U.S. PATENT DOCUMENTS

| | | | |
|---|---|---|---|
| 2006/0237953 A1* | 10/2006 | Abe | B60R 21/233 280/729 |
| 2008/0048420 A1* | 2/2008 | Washino | B60R 21/203 280/731 |
| 2008/0203710 A1* | 8/2008 | Kalliske | B60R 21/233 280/729 |
| 2011/0309605 A1* | 12/2011 | Kumagai | B60R 21/2338 280/741 |
| 2012/0242069 A1* | 9/2012 | Parks | B60R 21/2338 280/743.2 |
| 2013/0038046 A1* | 2/2013 | Inuzuka | B23D 15/145 280/743.2 |
| 2013/0056966 A1* | 3/2013 | Miyata | B60R 21/231 280/743.1 |
| 2013/0147171 A1* | 6/2013 | Shin | B60R 21/2338 280/743.2 |
| 2015/0158452 A1* | 6/2015 | Choi | B60R 21/233 280/732 |
| 2015/0166002 A1* | 6/2015 | Fukawatase | B60R 21/233 280/730.1 |
| 2015/0258959 A1* | 9/2015 | Belwafa | B60R 21/233 280/729 |
| 2015/0298643 A1* | 10/2015 | Schneider | B60R 21/233 280/729 |
| 2015/0307056 A1* | 10/2015 | Cheng | B60R 21/231 280/729 |
| 2015/0321636 A1* | 11/2015 | Jang | B60R 21/233 280/743.2 |
| 2015/0367802 A1* | 12/2015 | Fukawatase | B60R 21/205 280/732 |
| 2016/0059817 A1* | 3/2016 | Umehara | B60R 21/233 280/729 |
| 2016/0096503 A1* | 4/2016 | Lee | B60R 21/231 280/743.2 |
| 2016/0144820 A1* | 5/2016 | Shin | B60R 21/239 280/735 |
| 2016/0207490 A1* | 7/2016 | Yamada | B60R 21/2338 |
| 2016/0311392 A1* | 10/2016 | Jindal | B60R 21/231 |
| 2017/0015270 A1* | 1/2017 | Ohno | B60R 21/233 |
| 2017/0021794 A1* | 1/2017 | Sumiya | B60R 21/233 |
| 2017/0217399 A1* | 8/2017 | Patel | B60R 21/233 |
| 2018/0281742 A1* | 10/2018 | Komatsu | B60R 21/2338 |

FOREIGN PATENT DOCUMENTS

| | | |
|---|---|---|
| JP | 2014-121965 A | 7/2014 |
| WO | 2015/152137 A1 | 10/2015 |
| WO | 2016/147682 A1 | 9/2016 |

\* cited by examiner

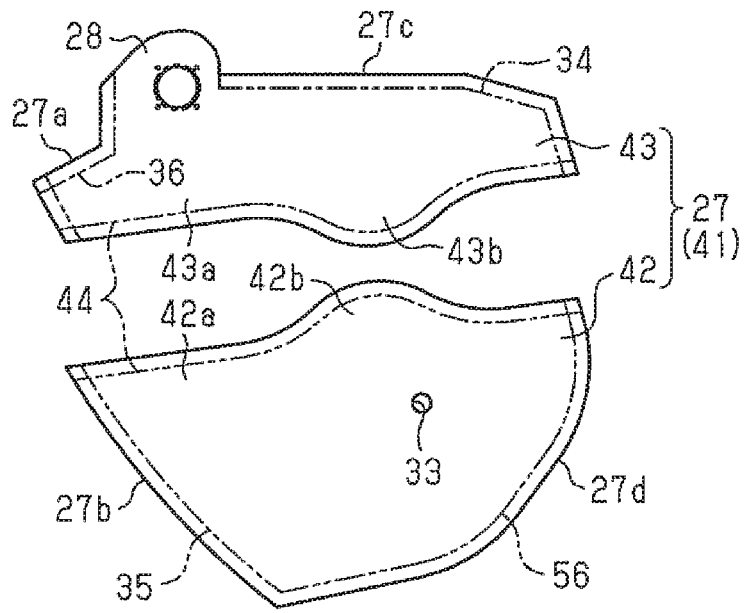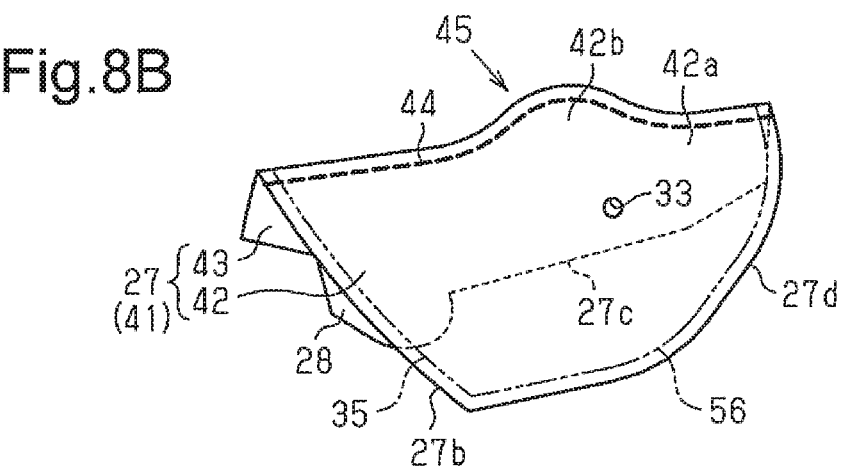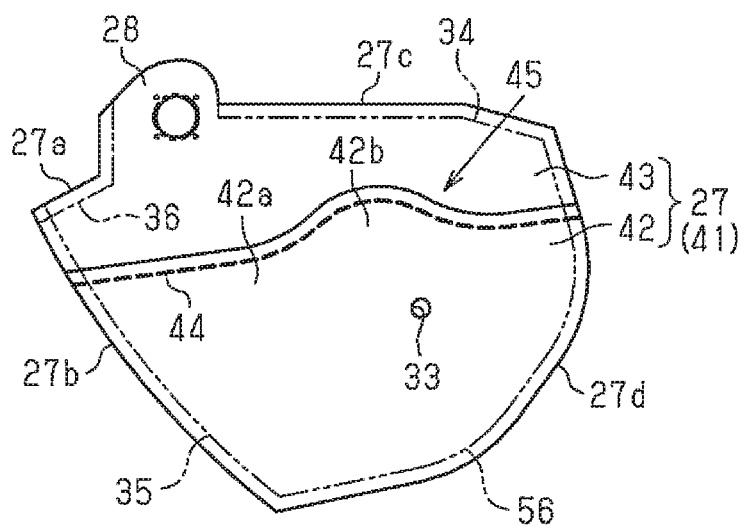

Prior Art

VEHICLE AIRBAG APPARATUS

BACKGROUND

The present invention relates to a vehicle airbag apparatus that deploys and inflates the bag body of the airbag with inflation gas when an impact is applied to the vehicle, such as an automobile, from the front side, for example, to protect an occupant sitting in a front seat from the impact.

When an impact is applied to the vehicle from the front side due to a frontal collision, for example, the upper body of the occupant sitting in a vehicle seat acts to lean forward by inertia. In such an incident, a vehicle airbag apparatus is useful that deploys and inflates the bag body of the airbag in front of the occupant to protect the occupant from the impact (see Japanese Laid-Open Patent Publication No. 2008-254500, for example).

The vehicle airbag apparatus includes an airbag and an inflator (a gas generator). In the vehicle airbag apparatus that protects an occupant sitting in a front seat from an impact, the bag body of the airbag is folded and installed, together with the inflator, in the storage section of the instrument panel located in front of the front seat.

When an impact is applied to the vehicle from the front side, the inflator of the vehicle airbag apparatus feeds inflation gas to the bag body. The inflation gas causes the bag body to exit the instrument panel, with a part of the bag body remaining within the storage section, and deploys and inflates the bag body rearward. The bag body receives the body of the occupant, which acts to lean forward, and protects the occupant from the impact while being supported by (in contact with) the instrument panel.

Conventional vehicle airbag apparatuses, including the apparatus of the above-described publication, are designed based on the assumption that the surface of the instrument panel that supports the bag body extends along the vehicle width direction. Different positions in the vehicle width direction of this surface are all located at the same position in the front-rear direction. This allows the bag body to receive the occupant while being supported by the instrument panel in front of the occupant.

However, when a conventional vehicle airbag apparatus, including the apparatus of the above-described publication, is installed in an instrument panel whose surface for supporting the bag body extends obliquely to the vehicle width direction, the following problem may occur. As shown in FIG. 15, a bag body 102 exits a storage section 101 and is supported by an oblique section 103a of an instrument panel 103 that is oblique to the vehicle width direction. This support causes the bag body 102 to be deployed and inflated obliquely to the front-rear direction. The rear end of the bag body 102 is therefore misaligned from the front of the occupant P1 in the vehicle width direction. This may prevent the bag body 102 from properly receiving the occupant P1.

SUMMARY

It is an objective of the present invention to provide a vehicle airbag apparatus that deploys and inflates a bag body of a simple structure from an instrument panel having an oblique section and at a proper position in front of an occupant.

To achieve the foregoing objective, a vehicle airbag apparatus is provided that includes an airbag configured to be installed in a storage section of an instrument panel located in front of a front seat in a vehicle. The airbag includes a bag body, into which inflation gas is fed in response to an impact applied to the vehicle. The bag body is caused, by the inflation gas, to exit the instrument panel with a part of the bag body remaining in the storage section to be deployed and inflated rearward, and receives an occupant sitting in the front seat. A part of the bag body is constituted by a peripheral wall panel section, which includes a pair of panels arranged in a vehicle width direction. At least one of the panels of the peripheral wall panel section constitutes an assembled panel, which is constituted by a plurality of fabric pieces, adjacent ones of the fabric pieces being joined by a peripheral edge joint section. The assembled panel includes a support inflation section that is configured to, when the bag body is deployed and inflated, project outward of the bag body further than other sections of the assembled panel so as to be in contact with the instrument panel. The support inflation section is constituted by a part of the peripheral edge joint section and a part of each of the two fabric pieces that are joined by the peripheral edge joint section.

BRIEF DESCRIPTION OF THE DRAWINGS

FIG. 8A is a schematic view showing a manufacturing step of the airbag of the embodiment.

FIG. 8B is a schematic view showing the manufacturing step of the airbag subsequent to the step in FIG. 8A.

FIG. 8C is a schematic view showing the manufacturing step of the airbag subsequent to the step in FIG. 8B.

DETAILED DESCRIPTION OF THE PREFERRED EMBODIMENTS

A vehicle airbag apparatus according to one embodiment will now be described with reference to FIGS. 1 to 13.

In the following description, the forward driving direction of a vehicle is referred to as the front direction, and the reverse driving direction of the vehicle is referred to as the rear direction. Further, the up-down direction refers to the up-down direction of the vehicle, and the right-left direction refers to the vehicle width direction and is identical to the right-left direction of the vehicle in forward driving.

Figure 1:
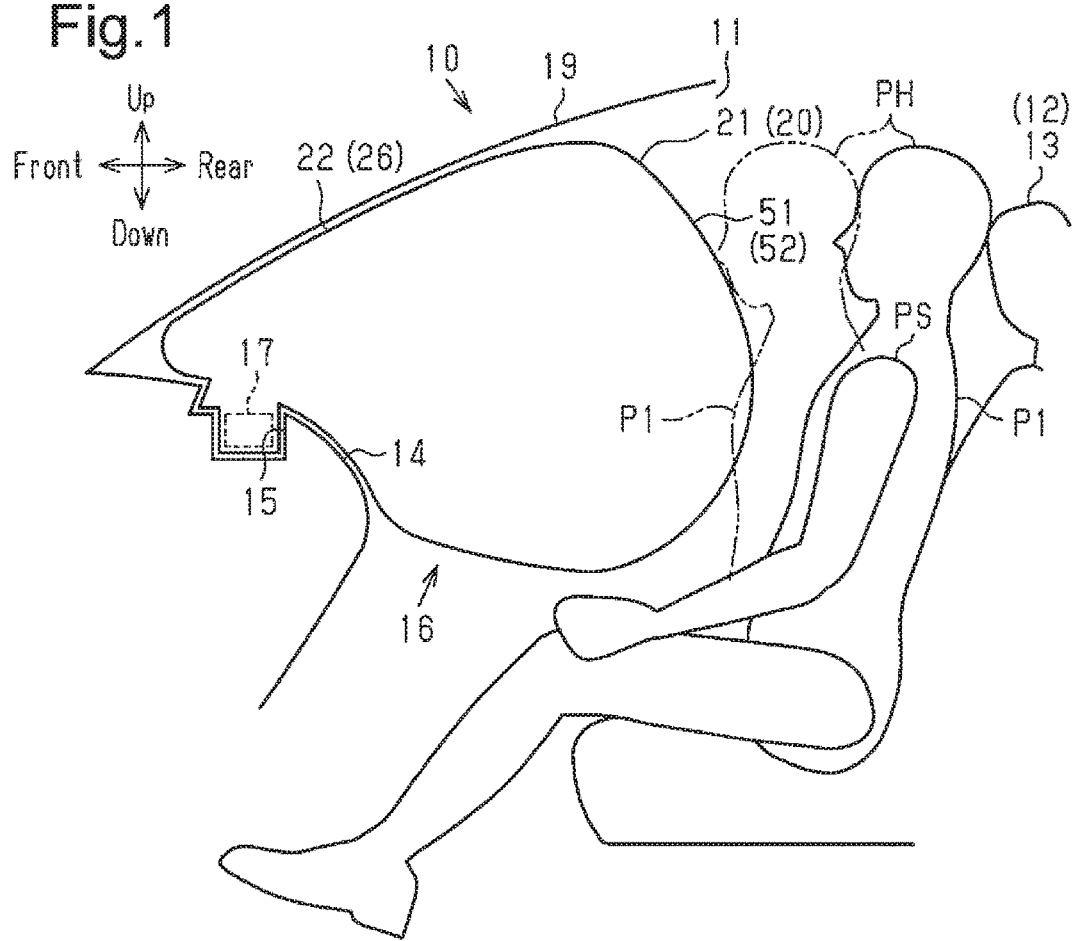
FIG. 1 is a side view schematically showing how a vehicle airbag apparatus of one embodiment protects an occupant from an impact.
Figure 13:
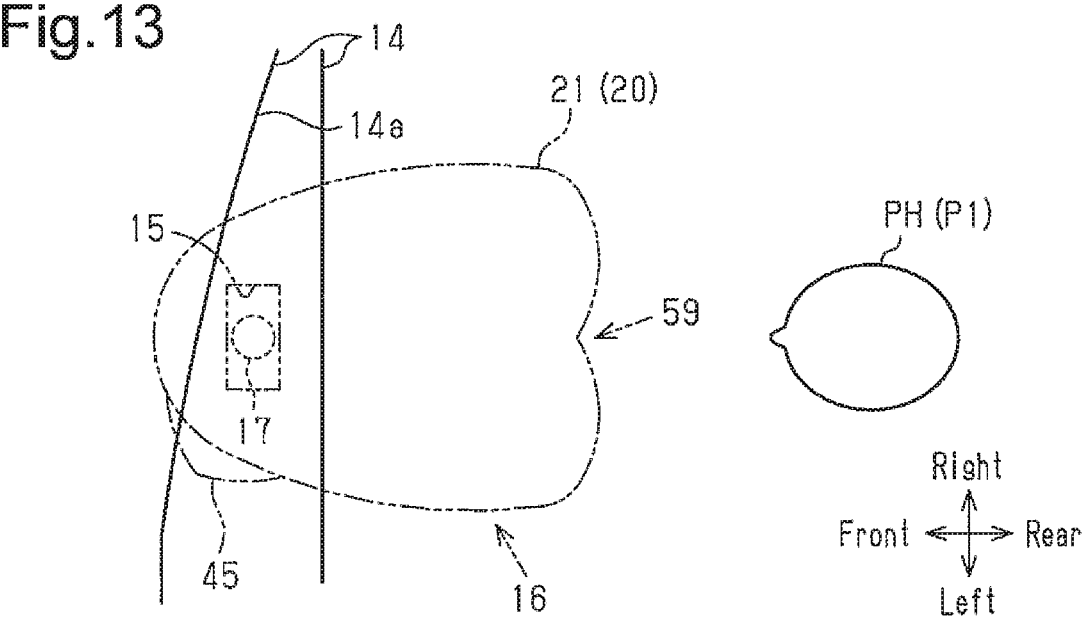
FIG. 13 is a schematic plan view showing the relationship between the instrument panel and the bag body of the embodiment.

As shown in FIGS. 1 and 13, a front passenger seat 13, which is a front seat 12, is located in the passenger compartment 11 of a vehicle 10. A seat belt device (not shown) is provided in the passenger compartment 11 to restrain an occupant P1 in the front passenger seat 13. A windshield 19 is located at the front of the passenger compartment 11. An instrument panel 14 is located under the windshield 19 and in front of the front seat 12 in the passenger compartment 11 and extends over the entire width of the passenger compartment 11 in the vehicle width direction. The instrument panel 14 has an oblique section 14a located in front of the front passenger seat 13. The oblique section 14a is oblique to the vehicle width direction (right-left direction) such that the vehicle outer side (right side) of the oblique section 14a is located rearward. The instrument panel 14 also has a storage section 15 in front of the front passenger seat 13.

The vehicle 10 includes a vehicle airbag apparatus 16, which protects the occupant P1 from an impact that is applied to the vehicle 10 from the front side due to a frontal collision, for example. The vehicle airbag apparatus 16 includes an inflator 17 and an airbag 20.

Figure 3:
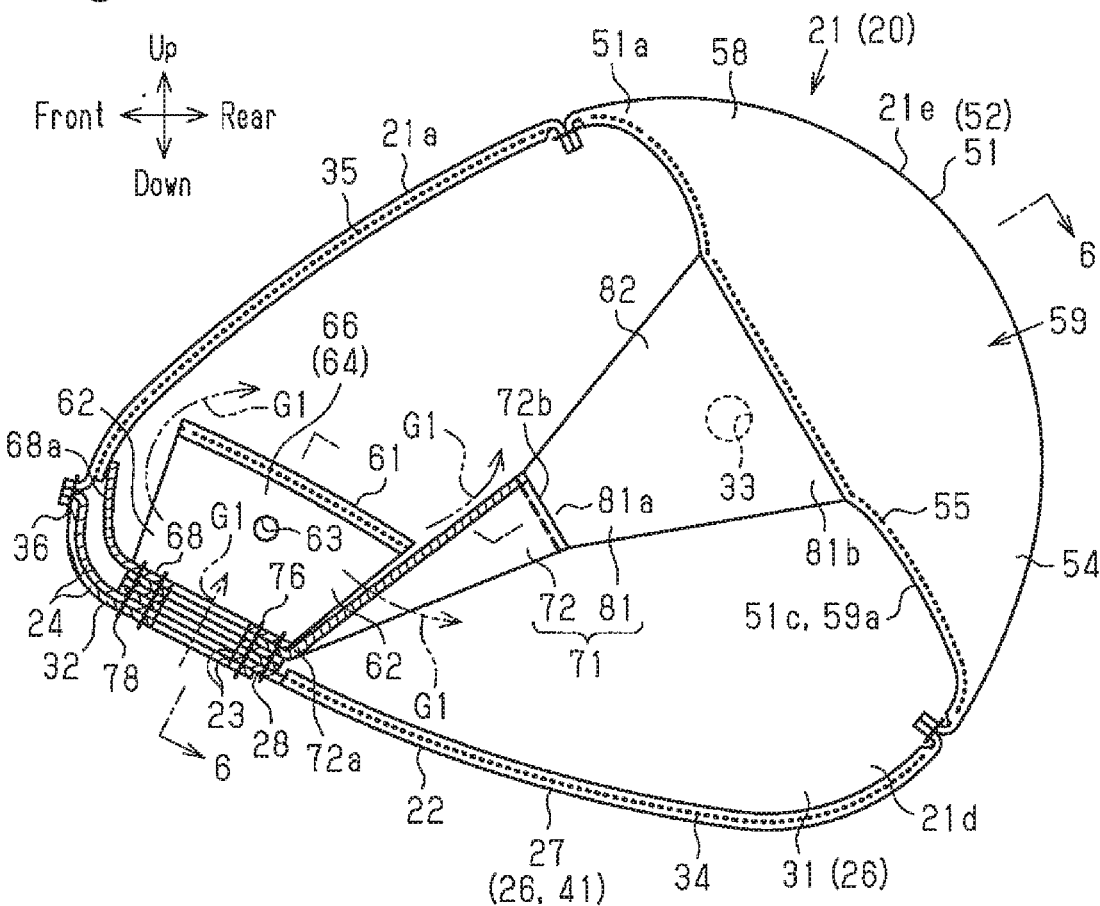
FIG. 3 is a cross-sectional view showing the inner structure of the airbag of FIG. 2.

The inflator 17 accommodates an igniter and a chemical agent (not shown). The base of the inflator 17 is connected to a connector (not shown). When the inflator 17 receives an electric signal through the connector, the ignitor ignites the chemical agent, causing a jet of inflation gas G1 to flow out (FIG. 3). Instead of this type of inflator, the inflator 17 may be of a type that causes a jet of inflation gas G1 to flow out by breaking a partition wall of a high-pressure gas cylinder using low explosive, for example.

The airbag 20 is dimensioned to be deployable and inflatable between the instrument panel 14 and the occupant P1. The airbag 20 is folded into a compact shape, stored in the storage section 15 together with the inflator 17, and secured to the vehicle body.

Figure 6:
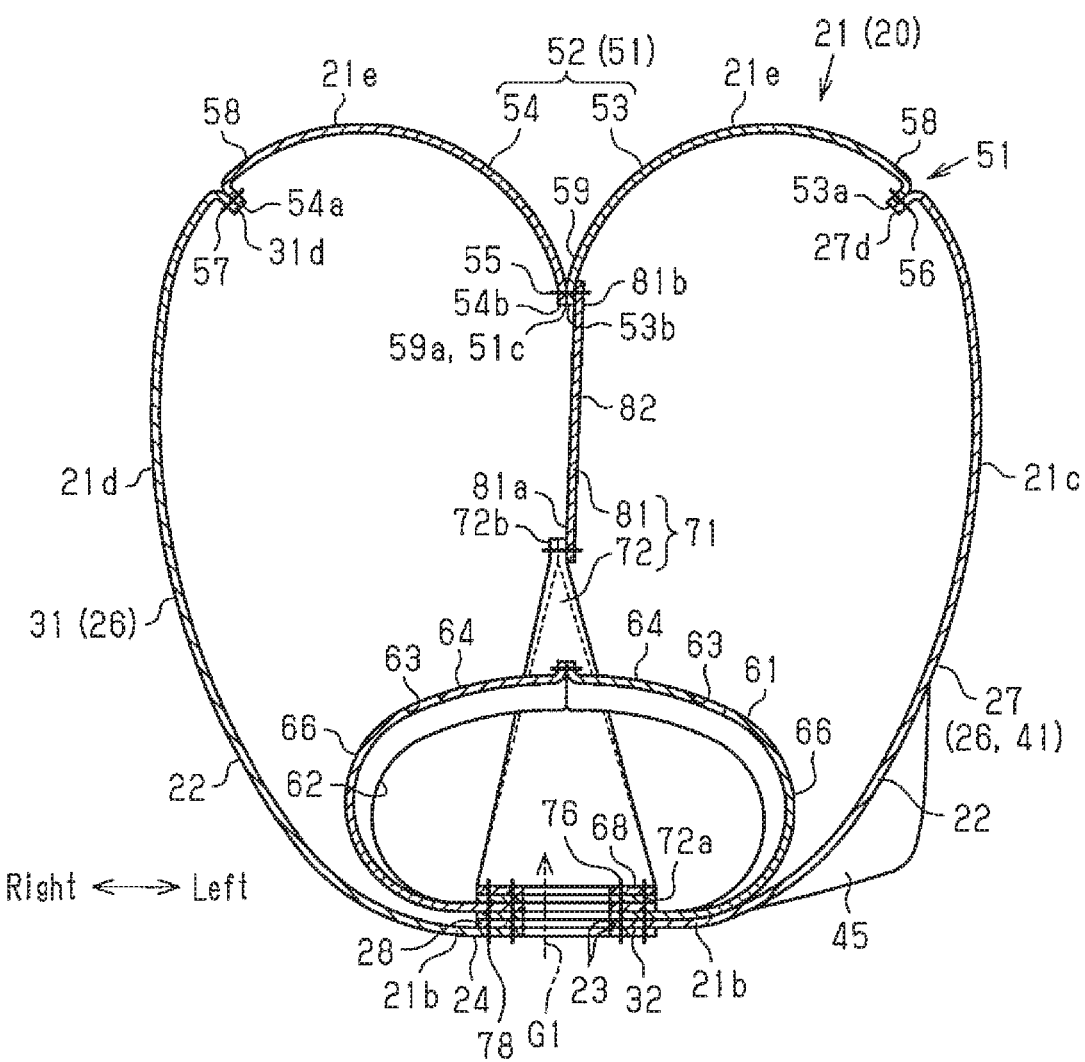
FIG. 6 is a cross-sectional view taken along line 6-6 in FIG. 3.

As shown in FIGS. 3 and 6, the airbag 20 includes a bag body 21, a flow guide fabric 61, a reinforcement fabric 68, and a tether 71. These components are all made of materials that are strong, flexible, and easy to fold. Such materials may be a woven fabric made of polyester yarn or polyamide yarn.

The components constituting the airbag 20 are now described.

<Bag Body 21>

Figure 2:
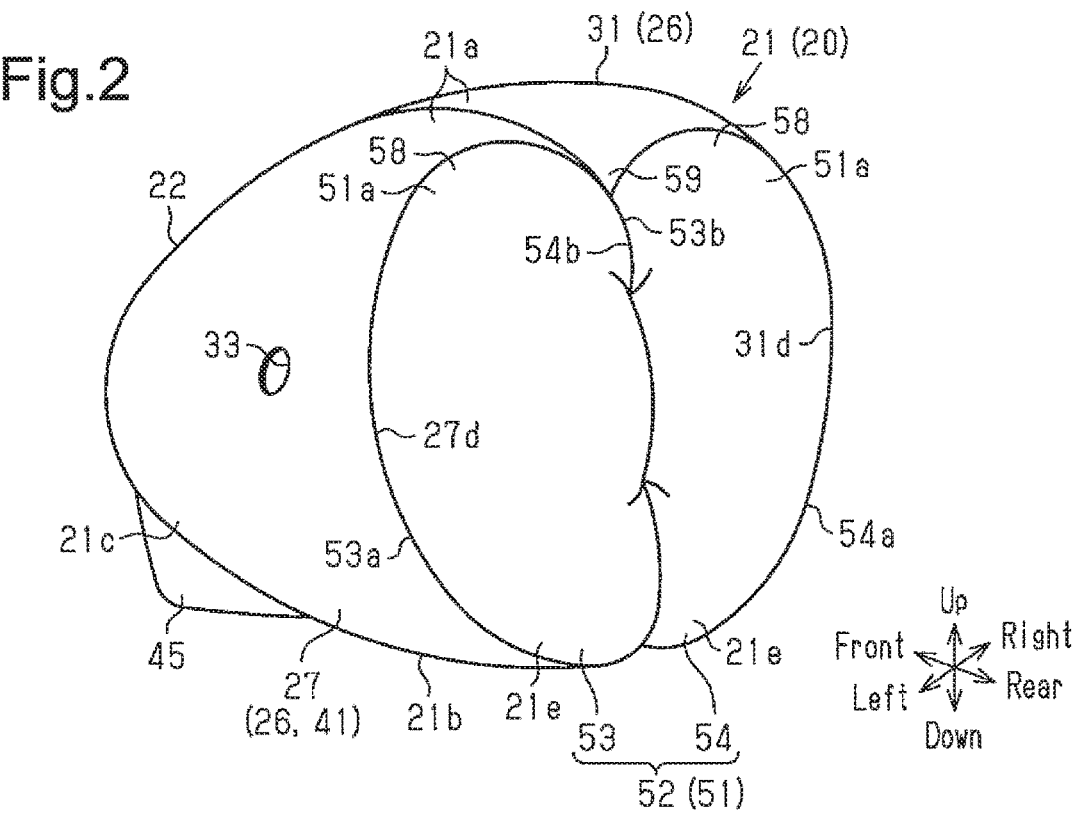
FIG. 2 is a perspective view showing a bag body of the embodiment, which is deployed and inflated.

As shown in FIGS. 1 to 3, the deployed and inflated bag body 21 substantially has the shape of a quadrangular pyramid, with the front end being the apex of the pyramid. The bag body 21 includes a vehicle body-side section 22 and an occupant protection section 51.

When deployment and inflation of the bag body 21 are completed, the vehicle body-side section 22 is located between the instrument panel 14 and the windshield 19. The vehicle body-side section 22 is mainly formed by a peripheral wall panel section 26. The vehicle body-side section 22 is substantially tubular and has a closed front end.

The occupant protection section 51 is located rearward of the vehicle body-side section 22 when deployment and inflation of the bag body 21 are completed, and receives the occupant P1 who is moving forward. The occupant protection section 51 is mainly formed by an occupant panel section 52.

As shown in FIGS. 2, 3 and 6, the lower front end of the vehicle body-side section 22 constitutes the front end of the lower wall section 21b of the bag body 21. The lower front end of the vehicle body-side section 22 includes a circular gas inlet 23, which allows inflation gas G1 to flow into the bag body 21. The vehicle body-side section 22 is attached to the vehicle body at the rim 24 of the gas inlet 23.

The peripheral wall panel section 26 of the vehicle body-side section 22 includes a left panel 27 and a right panel 31. The left panel 27 and the right panel 31 are line-symmetric in the vehicle width direction. Each of the left and right panels 27 and 31 substantially has the shape of a sector having a wider rear end (see FIG. 7A).

Figure 7A:
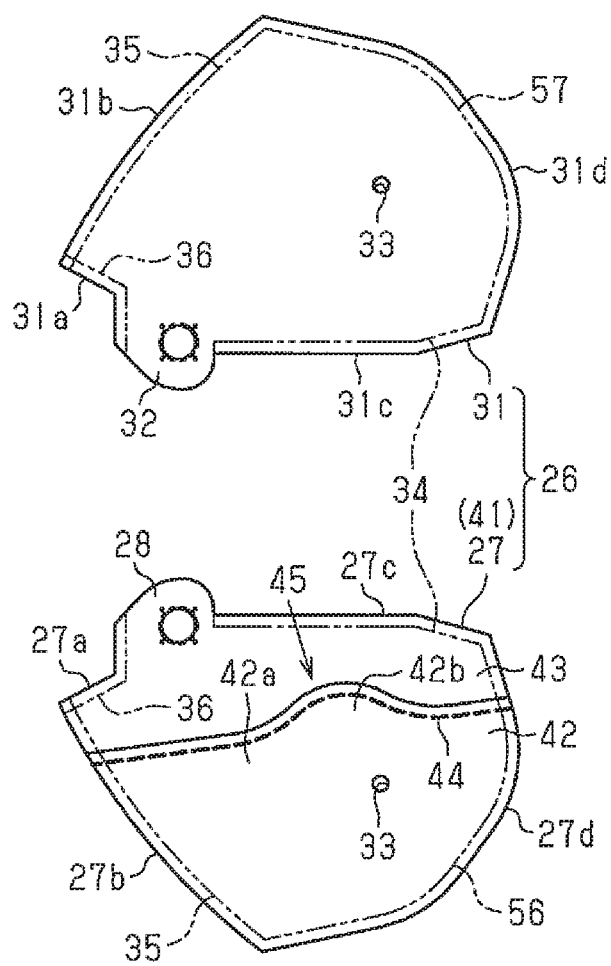
FIG. 7A is a developed view showing components of the airbag of the embodiment.
Figure 7B:
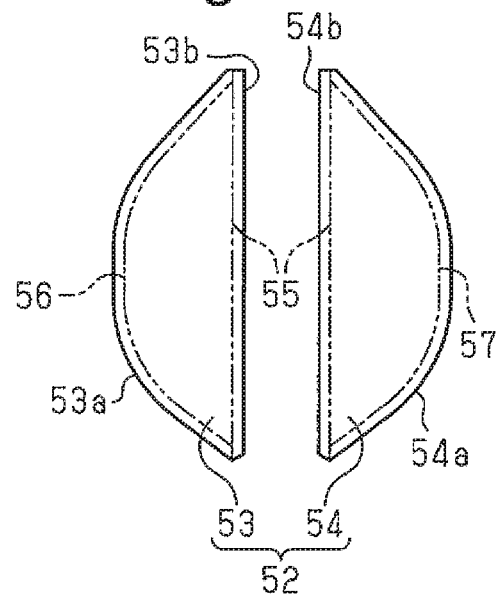
FIG. 7B is a developed view showing components of the airbag of the embodiment.

As shown in FIGS. 2, 6 and 7A, the central section in the up-down direction of the left panel 27 constitutes the left wall section 21c of the bag body 21. The upper section of the left panel 27 constitutes the left side of the upper wall section 21a of the bag body 21. The lower section of the left panel 27 constitutes the left side of the lower wall section 21b of the bag body 21. The lower front end of the left panel 27 includes a substantially semicircular protrusion 28, which constitutes the rim 24 of the gas inlet 23.

The central section in the up-down direction of the right panel 31 constitutes the right wall section 21d of the bag body 21. The upper section of the right panel 31 constitutes the right side of the upper wall section 21a of the bag body 21. The lower section of the right panel 31 constitutes the right side of the lower wall section 21b of the bag body 21. The front lower end of the right panel 31 includes a protrusion 32, which constitutes the rim 24 of the gas inlet 23.

That is, the left panel 27 and the right panel 31 divide the region surrounded by the upper wall section 21a, the lower wall section 21b, the left wall section 21c, and the right wall section 21d, at the central part in the vehicle width direction of the upper wall section 21a and the central part in the vehicle width direction of the lower wall section 21b.

The left panel 27 and the right panel 31 each include a vent hole 33 for discharging excess inflation gas G1 in the bag body 21.

As shown in FIG. 7A, the lower edge 27c of the left panel 27 is joined to the lower edge 31c of the right panel 31 by a peripheral edge joint section 34. The peripheral edge joint section 34 is formed by sewing the left panel 27 and the right panel 31 together along the lower edges 27c and 31c with sewing thread.

In FIGS. 3, 4 and 7A to 11D, two types of lines are used to represent the sewn sections. A line of the first type is formed by intermittently arranging bold lines of a fixed length. This line represents a sewing thread as viewed from the side, for example (see the peripheral edge joint section 44 in FIG. 7A). A line of the second type is formed by arranging dots at regular intervals. This line represents the cross section of a sewing thread in a plane extending through the sewn section (see the peripheral edge joint section 55 in FIG. 3).

As shown in FIG. 7A, the upper edge 27b of the left panel 27 is joined to the upper edge 31b of the right panel 31 by a peripheral edge joint section 35. The peripheral edge joint section 35 is formed by sewing the left panel 27 and the right panel 31 together along the upper edges 27b and 31b with sewing thread.

The front edge 27a of the left panel 27 is joined to the front edge 31a of the right panel 31 by a peripheral edge joint section 36. The peripheral edge joint section 36 is formed by sewing the left panel 27 and the right panel 31 together along the front edges 27a and 31a with sewing thread.

As shown in FIGS. 8A to 8C, the left panel 27 of the present embodiment is constituted by an assembled panel 41. The assembled panel 41 includes two fabric pieces 42 and 43, which are adjacent to each other. The fabric piece 42 includes a general section 42a and a protrusion 42b, which protrudes from an edge of the general section 42a. The edge of the fabric piece 42 is curved in the boundary sections between the general section 42a and the protrusion 42b. The other fabric piece 43 includes a general section 43a and a protrusion 43b, which protrudes from an edge of the general section 43a. The edge of the fabric piece 43 is curved in the boundary sections between the general section 43a and the protrusion 43b. The edges of the fabric pieces 42 and 43 are joined together by a peripheral edge joint section 44. The peripheral edge joint section 44 is formed by sewing the edges of the adjacent fabric pieces 42 and 43 together with sewing thread. The two protrusions 42b and 43b and the part of the peripheral edge joint section 44 joining the protrusions 42b and 43b constitute a support inflation section 45. When the bag body 21 is deployed and inflated, the support inflation section 45 protrudes outward of the bag body 21 further than the other sections of the assembled panel 41 so as to be in contact with the instrument panel 14.

As shown in FIGS. 2, 6, 7A and 7B, the occupant panel section 52 of the occupant protection section 51 constitutes the rear wall section 21e of the bag body 21. The left half of the occupant panel section 52 is constituted by a left panel 53, and the right half is formed by a right panel 54.

The left panel 53 and the right panel 54 are line-symmetric in the vehicle width direction. The inner edge 53b of the left panel 53 is joined to the inner edge 54b of the right panel 54 by a peripheral edge joint section 55. The peripheral edge joint section 55 is formed by sewing the left panel 53 and the right panel 54 together along the inner edges 53b and 54b with sewing thread. The peripheral edge joint section 55 extends in the up-down direction in the central part in the vehicle width direction of the rear wall section 21e when deployment and inflation of the bag body 21 are completed.

The outer edge 53a of the left panel 53 is shaped to conform to the rear edge 27d of the left panel 27. The outer edge 54a of the right panel 54 is shaped to conform to the rear edge 31d of the right panel 31. The outer edge 53a of the left panel 53 is joined to the rear edge 27d of the left panel 27 by a peripheral edge joint section 56. The peripheral edge joint section 56 is formed by sewing the left panel 53 and the left panel 27 together along the outer edge 53a and the rear edge 27d with sewing thread. In a similar manner, the outer edge 54a of the right panel 54 is joined to the rear edge 31d of the right panel 31 by a peripheral edge joint section 57. The peripheral edge joint section 57 is formed by sewing the right panel 54 and the right panel 31 together along the outer edge 54a and the rear edge 31d with sewing thread.

As shown in FIGS. 2 and 6, the two side sections in the vehicle width direction of the occupant protection section 51 are constituted by a pair of protrusions 58, which is inflated to protrude rearward. The region of the occupant protection section 51 between the protrusions 58 includes a recess 59, which substantially extends frontward. The recess 59 is located in the substantially central part in the vehicle width direction of the occupant protection section 51 and substantially runs over the entire length in the up-down direction of the occupant protection section 51.

As shown in FIGS. 3 and 6, the occupant protection section 51 includes an inner top section 51c, which constitutes the protrusion end 59a of the recess 59 on the inner side of the bag body 21. The inner top section 51c and the protrusion end 59a are constituted by the peripheral edge joint section 55.

<Flow Guide Fabric 61>

The flow guide fabric 61 is provided to guide the inflation gas G1 entering through the gas inlet 23 toward both the front and rear sides. The flow guide fabric 61 substantially has the shape of a tube extending in the front-rear direction and having two open ends. The flow guide fabric 61 is arranged in the bag body 21 so as to cover the gas inlet 23 from above. The inflation gas G1 entering the flow guide fabric 61 through the gas inlet 23 thus flows into the bag body 21 through the front and rear openings 62. The flow guide fabric 61 includes two circular through-holes 63 located at symmetric positions in the vehicle width direction above the gas inlet 23. Each through-hole 63 has a smaller opening area than the openings 62. The through-holes 63 discharge some of the inflation gas G1 flowing into the flow guide fabric 61 through the gas inlet 23, stabilizing the orientation of the openings 62 and therefore the direction of the inflation gas G1 flowing into the bag body 21 during deployment and inflation of the bag body 21.

Figure 7C:
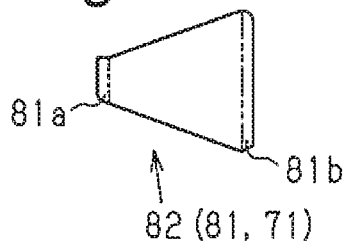
FIG. 7C is a developed view showing a component of the airbag of the embodiment.
Figure 7D:
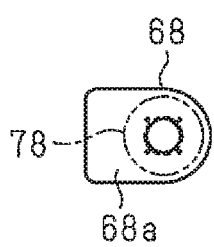
FIG. 7D is a developed view showing a component of the airbag of the embodiment.
Figure 7E:
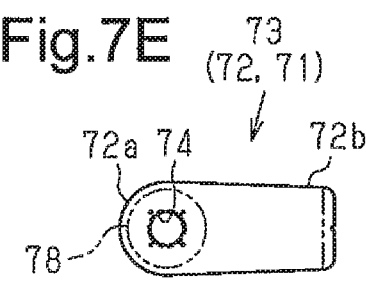
FIG. 7E is a developed view showing a component of the airbag of the embodiment.
Figure 7F:
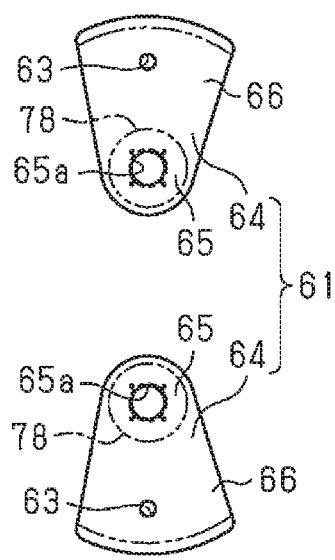
FIG. 7F is a developed view showing components of the airbag of the embodiment.

The flow guide fabric 61 includes two fabric pieces 64 as shown in FIG. 7F. Each fabric piece 64 is constituted by a coupling section 65, which is located above the rim 24 of the gas inlet 23, and a main section 66, which extends leftward or rightward from the coupling section 65. The coupling section 65 includes an aperture 65a, which corresponds to the gas inlet 23. The main section 66 includes the through-hole 63. The coupling sections 65 are stacked such that the apertures 65a of the fabric pieces 64 are aligned to each other. The entire periphery of the coupling section 65 of each fabric piece 64 is sewn to the peripheral wall panel section 26 together with the reinforcement fabric 68 and a fabric piece 73 of the tether 71, which are described below.

<Reinforcement Fabric 68>

Referring to FIGS. 3 and 7D, the reinforcement fabric 68 is used to reinforce the rim 24 of the gas inlet 23 of the bag body 21. The reinforcement fabric 68 includes an extension 68a extending frontward from the gas inlet 23. When deployment and inflation of the bag body 21 are completed, the extension 68a covers the inner side of the peripheral edge joint section 36, so that the inflation gas G1 flowing into the bag body 21 through the gas inlet 23 is less likely to directly strike the peripheral edge joint section 36.

<Tether 71>

Referring to FIGS. 3 and 6, the tether 71 is provided to hold the shape of the deployed and inflated bag body 21. The tether 71 bridges the inner top section 51c of the occupant protection section 51 and the rim 24 of the gas inlet 23. Deployment and inflation of the bag body 21 stretch the tether 71 in the front-rear direction. The tether 71 includes a front section 72, which is closer to the gas inlet 23, and a rear section 81, which is closer to the occupant protection section 51.

Figure 5:
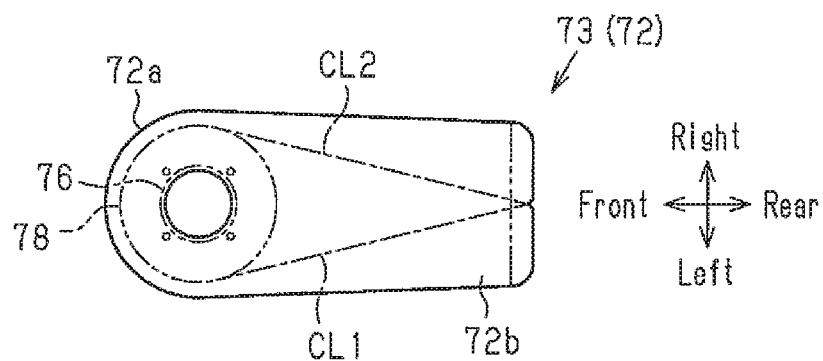
FIG. 5 is a plan view showing the front section of the tether of FIG. 4, which is spread flat.

As shown in FIGS. 5 and 7E, a strip-shaped fabric piece 73, which extends in the front-rear direction, forms the front section 72. The fabric piece 73 is symmetrical about the gas inlet 23 in the vehicle width direction. The fabric piece 73 is folded to form the front section 72.

Figure 4:
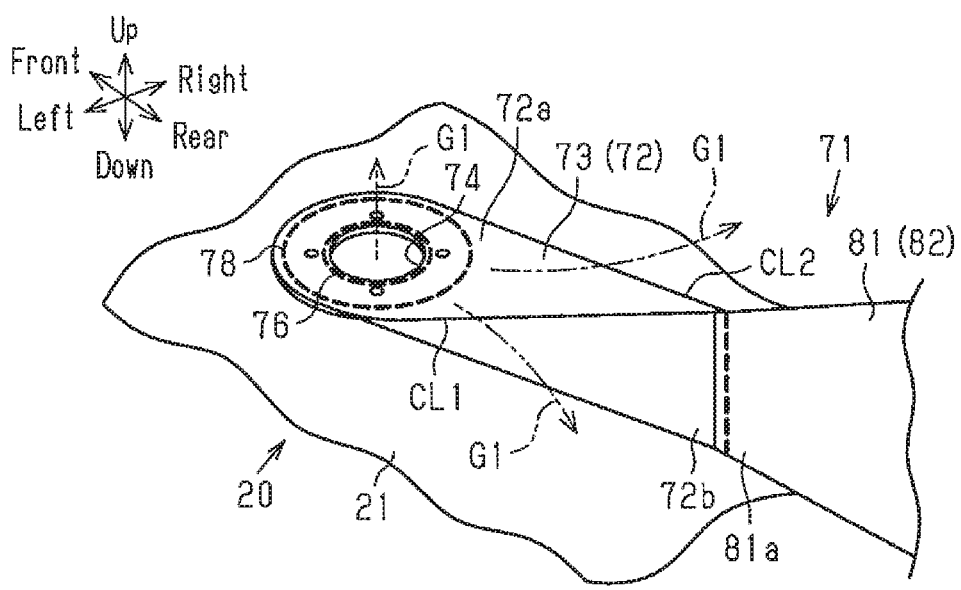
FIG. 4 is a partial perspective view showing the schematic configuration of a part of a tether of the embodiment.

As shown in FIGS. 3, 4 and 6, when deployment and inflation of the bag body 21 are completed, the front section 72 has a three-dimensional shape that resembles a triangular pyramid. The front end 72a of the front section 72 substantially extends in the vehicle width direction, and the rear end 72b substantially extends in the up-down direction.

In this three-dimensional shape, an aperture 74 is located at the position in the front end 72a of the front section 72 that corresponds to the gas inlet 23. The front section 72 is joined to the bag body 21 by a joint section 76 extending around the aperture 74 in the front end 72a. The joint section 76 is formed by sewing the entire rim of the aperture 74 in the front end 72a of the front section 72 to the rim 24 of the gas inlet 23 of the peripheral wall panel section 26.

The part of the front section 72 located rearward of the joint section 76 has a three-dimensional shape that resembles a substantially triangular pyramid. This part has an open lower side and a closed upper side and is inclined such that its height increases rearward.

As shown in FIGS. 7D, 7E and 7F, the fabric pieces 64 of the flow guide fabric 61, the fabric piece 73 of the tether 71, and the reinforcement fabric 68 are joined together by a joint section 78. The joint section 78 is formed by sewing the fabric pieces 64 and 73 and the reinforcement fabric 68 together with sewing thread.

As shown in FIGS. 3, 6 and 7C, the rear section 81 of the tether 71 is formed by a fabric piece 82. The fabric piece 82 is trapezoidal and has a width that increases from the narrowest front end toward the rear end. The rear section 81 is arranged such that the width direction of the rear section 81 extends along the up-down direction when deployment and inflation of the bag body 21 are completed (see FIG. 4).

The front end 81a of the rear section 81 and the rear end 72b of the front section 72 are stacked and joined with sewing thread. The rear end 81b of the rear section 81 is sewn with sewing thread from its top to bottom to the part of the inner top section 51c (the protrusion end 59a of the recess 59) that is located near the upper end 51a of the occupant protection section 51 when deployment and inflation of the bag body 21 are completed. More specifically, the rear end 81b of the rear section 81 is sewn together with the inner edge 53b of the left panel 53 and the inner edge 54b of the right panel 54 of the occupant panel section 52 during the formation of the peripheral edge joint section 55. The rear end 81b of the rear section 81 is sewn to the central section in the up-down direction of the deployed and inflated bag body 21, that is, the position of the protrusion end 59a of the recess 59 that corresponds to the head PH of the occupant P1.

An operation and advantages of the above-described embodiment will now be described.

First, a method for manufacturing the airbag 20 is described.

Figure 11A:
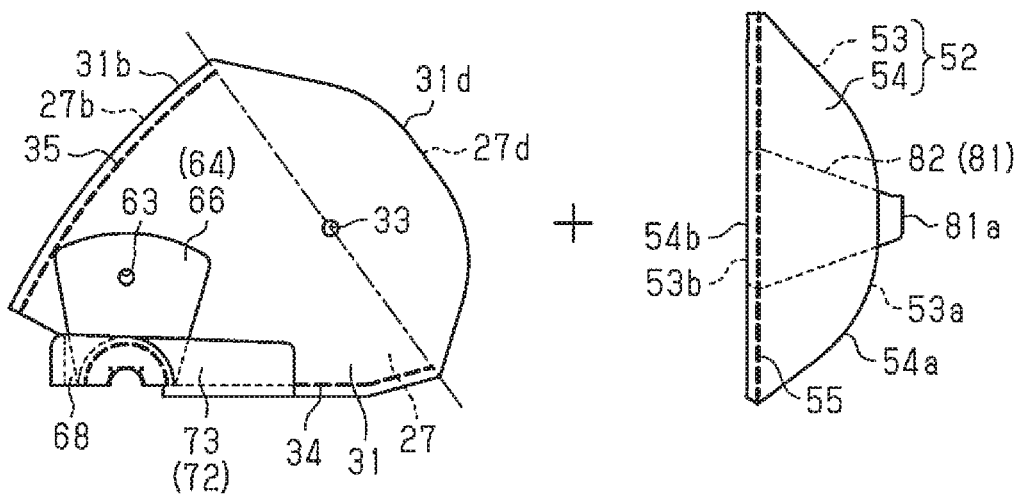
FIG. 11A is a schematic view showing the manufacturing step subsequent to the step in FIG. 10B.

As shown in FIG. 11A, the left panel 53 and the right panel 54 of the occupant panel section 52 and the fabric piece 82 of the rear section 81 of the tether 71 are spread flat and stacked. The inner edge 53b of the left panel 53, the inner edge 54b of the right panel 54, and the rear end of the fabric piece 82 are sewn together with sewing thread, forming the peripheral edge joint section 55.

Referring to FIG. 8A, the fabric pieces 42 and 43 are spread flat and stacked. The fabric pieces 42 and 43 are stacked such that the edge of the general section 42a is aligned to the edge of the general section 43a and that the edge of the protrusion 42b is aligned to the edge of the protrusion 43b.

The general sections 42a and 43a are sewn together along their edges, and the protrusions 42b and 43b are sewn together along their edges with sewing thread. As shown in FIG. 8B, this sewing forms the peripheral edge joint section 44 along the edges of the general sections 42a and 43a and the edges of the protrusions 42b and 43b of the two fabric pieces 42 and 43. The formation of the peripheral edge joint section 44 joins the two fabric pieces 42 and 43 together. In addition, the support inflation section 45 is formed by the two protrusions 42b and 43b and the part of the peripheral edge joint section 44 extending along the edges of the protrusions 42b and 43b. The left panel 27 shown in FIG. 8C is obtained when the fabric pieces 42 and 43 are opened from the stacked state shown in FIG. 8B.

If the edges of the fabric pieces 42 and 43 and the peripheral edge joint section 44 have sharp corners in the boundary sections between the protrusions 42b and 43b and the general sections 42a and 43a, it would be difficult to form a sharp-cornered peripheral edge joint section 44 by sewing the boundary sections. This is because the angle of sewing changes significantly at sharp corners of the peripheral edge joint section 44.

In this respect, the edges of the fabric pieces 42 and 43 and the peripheral edge joint section 44 of the present embodiment are curved in the boundary sections between the protrusions 42b and 43b and the general sections 42a and 43a. The shape of the peripheral edge joint section 44 changes gradually in the curved boundary sections, facilitating the sewing process.

Further, a bag body having the same function as the bag body 21 of the present embodiment may be obtained by constituting the bag body using a main airbag member and a separate sub-airbag member, which are joined together by various joining means such as sewing. In this bag body, the sub-airbag member functions to correct tilting of the bag body in a similar manner as the support inflation section 45. However, this structure requires intricate joining of the sub-airbag member to the main airbag member. This may complicate the manufacturing.

In this respect, the edges of the two fabric pieces 42 and 43 of the assembled panel 41 of the present embodiment are joined by the peripheral edge joint section 44. In addition, the support inflation section 45 is formed by a part of the peripheral edge joint section 44 and a part of each of the two fabric pieces 42 and 43, which are joined by the peripheral edge joint section 44. That is, a part of the assembled panel 41 functions as the support inflation section 45, which corrects tilting of the bag body 21. The assembled panel 41 having the support inflation section 45 is formed by joining edges of the two fabric pieces 42 and 43 of the assembled panel 41 by the peripheral edge joint section 44. As such, the support inflation section 45 can be formed more easily than the above-described case, in which the sub-airbag member is joined to the main airbag member.

Figure 9A:
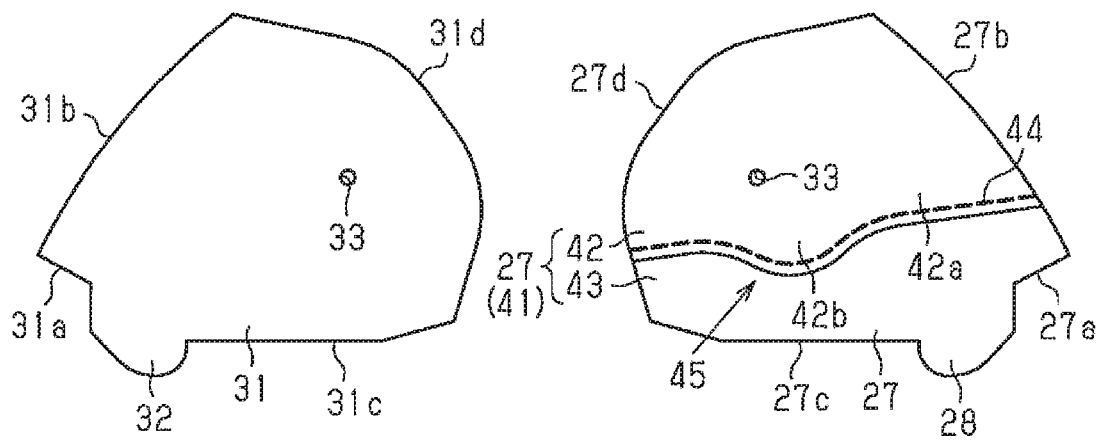
FIG. 9A is a schematic view showing the manufacturing step subsequent to the step in FIG. 8C.
Figure 9B:
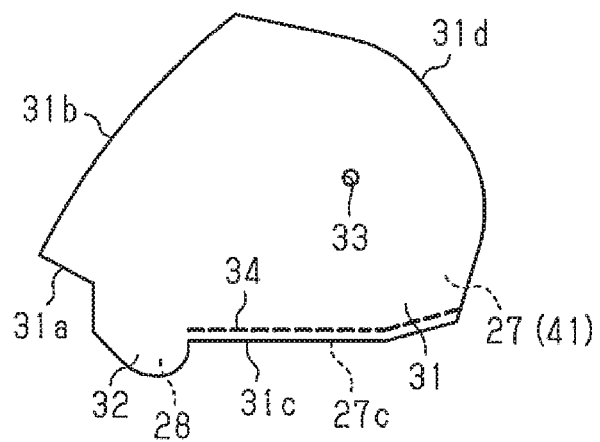
FIG. 9B is a schematic view showing the manufacturing step subsequent to the step in FIG. 9A.

As shown in FIGS. 9A and 9B, the left panel 27 and the right panel 31 are spread flat and stacked. The lower edge 27c of the left panel 27 and the lower edge 31c of the right panel 31 are sewn together with sewing thread, forming the peripheral edge joint section 34.

Figure 9C:
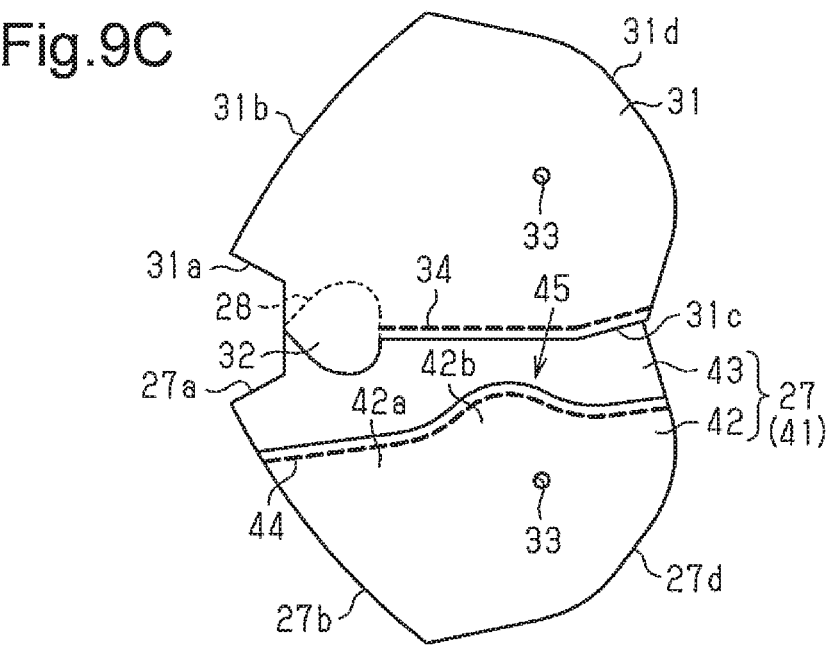
FIG. 9C is a schematic view showing the manufacturing step subsequent to the step in FIG. 9B.

Then, as shown in FIG. 9C, the left panel 27 and the right panel 31 are opened away from each other with the peripheral edge joint section 34 located on the inner side and with the protrusions 28 and 32 remaining stacked.

Figure 10A:
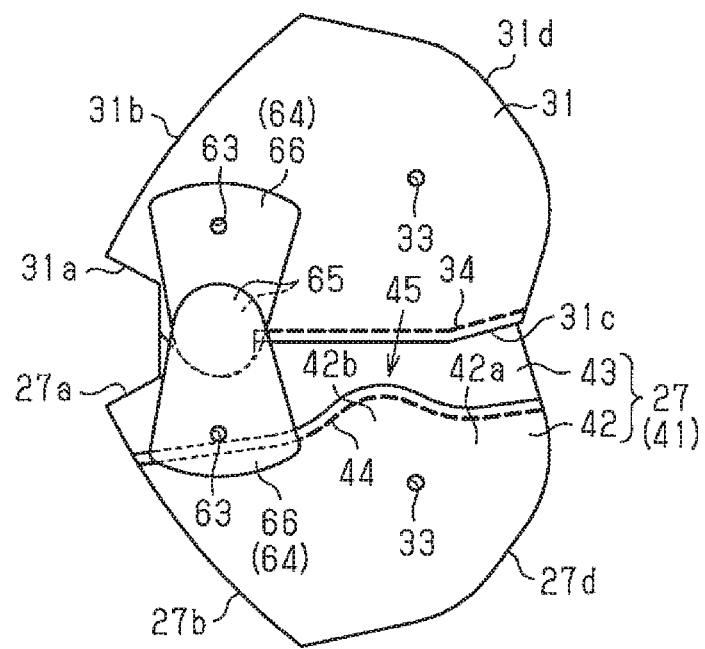
FIG. 10A is a schematic view showing the manufacturing step subsequent to the step in FIG. 9C.
Figure 10B:
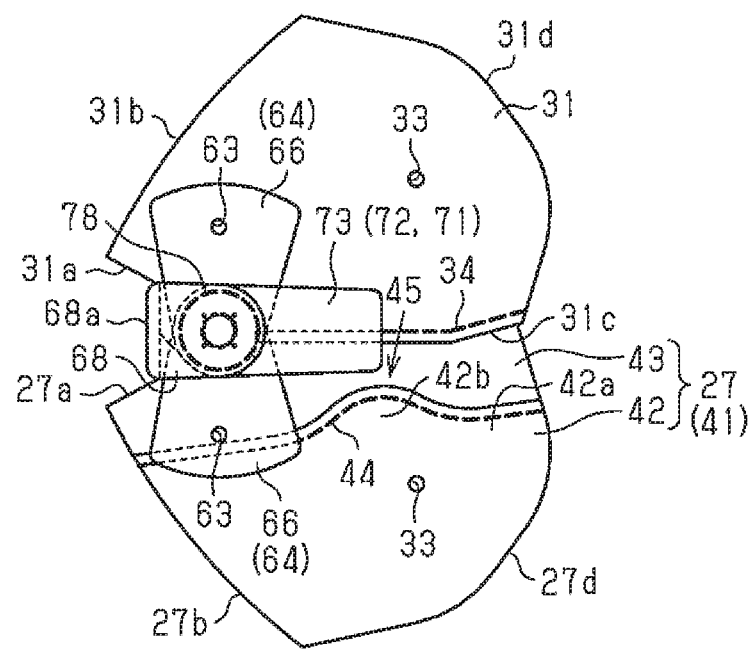
FIG. 10B is a schematic view showing the manufacturing step subsequent to the step in FIG. 10A.

As shown in FIG. 10A, the pair of fabric pieces 64 of the flow guide fabric 61 is stacked over the front ends of the left panel 27 and the right panel 31. Then, as shown in FIG. 10B, the fabric piece 73 of the tether 71 and then the reinforcement fabric 68 are stacked over the two fabric pieces 64. The joint section 78 is formed by sewing the fabric pieces 64 and 73 and the reinforcement fabric 68 together with sewing thread.

The gas inlet 23 is then formed in a perforation process.

As shown in FIG. 11A, the left panel 27 and the right panel 31 are stacked again. The upper edge 27b of the left panel 27 and the upper edge 31b of the right panel 31 are sewn together with sewing thread, forming the peripheral edge joint section 35.

The occupant panel section 52 is opened so that the outer edges 53a and 54a are apart from each other. The left panel 27 and the right panel 31 are opened such that the rear edge 27d of the left panel 27 is apart from the rear edge 31d of the right panel 31. The shape defined by the rear edges 27d and 31d of the opened left and right panels 27 and 31 is identical to the outer shape of the occupant panel section 52.

Figure 11B:
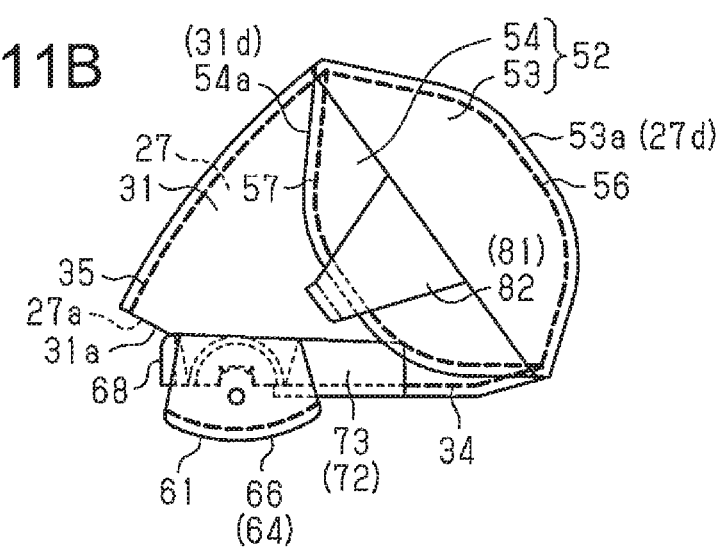
FIG. 11B is a schematic view showing the manufacturing step subsequent to the step in FIG. 11A.

As shown in FIG. 11B, the occupant panel section 52 is placed on the left panel 27 and the right panel 31. The outer edge 53a of the left panel 53 is sewn to the rear edge 27d of the left panel 27 with sewing thread, forming the peripheral edge joint section 56. The outer edge 54a of the right panel 54 is sewn to the rear edge 31d of the right panel 31 with sewing thread, forming the peripheral edge joint section 57.

Figure 11C:
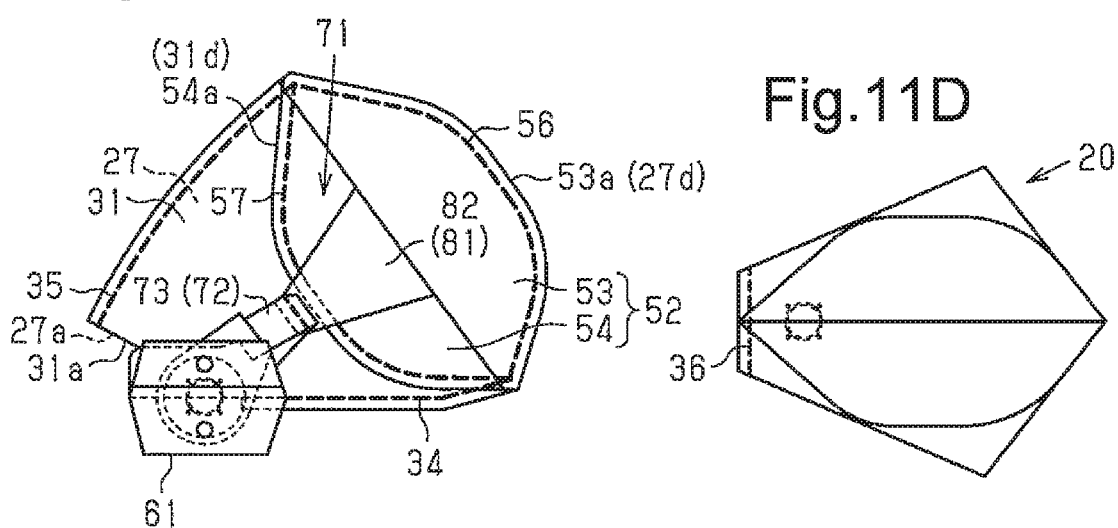
FIG. 11C is a schematic view showing the manufacturing step subsequent to the step in FIG. 11B.

As shown in FIGS. 11B and 11C, the edges of the main sections 66 of the fabric pieces 64 are sewn together, forming the flow guide fabric 61. Then, the fabric piece 73 is folded along folding lines CL1 and CL2 (FIGS. 4 and 5). The rear end of the folded fabric piece 73 is stacked over the front end of the fabric piece 82 and sewn over its entire length in the width direction. This connects the front section 72 to the rear section 81 and forms the tether 71.

Figure 11D:
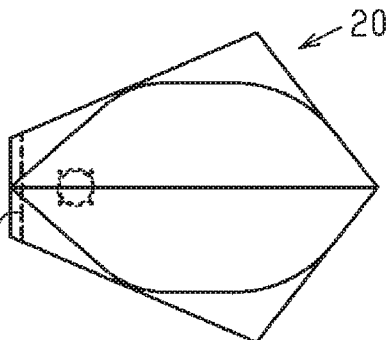
FIG. 11D is a schematic view showing the manufacturing step subsequent to the step in FIG. 11C.

Using the sections of the left panel 27 and the right panel 31 that are not sewn together (the front edges 27a and 31a; see FIG. 7A), the bag formed by the sewn fabric pieces is turned inside out so that the seam allowances in the edges are not exposed to the outside. As shown in FIG. 11D, the front edges 27a and 31a of the left and right panels 27 and 31 are then sewn together to form the peripheral edge joint section 36, thereby completing the airbag 20.

The operation of the vehicle airbag apparatus 16 is now described.

When an impact is applied to the vehicle 10 from the front side due to a frontal collision, for example, the upper body of the occupant P1 sitting in the front passenger seat 13 leans forward by inertia, as indicated by the dashed double-dotted line in FIG. 1.

Meanwhile, in response to the impact applied to the vehicle 10 from the front side, the inflation gas G1 is fed into the bag body 21 from the inflator 17 and through the gas inlet 23. The flow direction of the inflation gas G1 entering through the gas inlet 23 is regulated by the flow guide fabric 61 in the front-rear direction as shown in FIG. 3. Some of the inflation gas G1 is guided toward the upper rear side by the part of the front section 72 of the tether 71 that is inclined such that its height increases rearward. The inflation gas G1 starts inflation of the bag body 21 while unfolding (deploying) the bag body 21.

The pressing force resulting from the inflation of the bag body 21 opens the airbag door (not shown) provided in the instrument panel 14, creating an aperture (not shown) that allows deployment and inflation of the bag body 21. As shown in FIG. 1, the bag body 21 extends out of the instrument panel 14 through this aperture, while a part of the bag body 21 remains within the storage section 15. The bag body 21 is deployed and inflated rearward so as to occupy the space between the instrument panel 14 and the windshield 19. The bag body 21 is supported by the instrument panel 14 when receiving the occupant P1 who is leaning forward.

As shown in FIGS. 3 and 6, the deployment and inflation of the bag body 21 stretches the tether 71 into a tensioned state. The tether 71 holds the shape of the inflated bag body 21. When deployment and inflation of the bag body 21 are completed, the central part in the vehicle width direction of the occupant protection section 51 includes the recess 59, which extends frontward and runs in the up-down direction. The protrusions 58 extend rearward on the right and left sides of the recess 59 in the occupant protection section 51.

Figure 12:
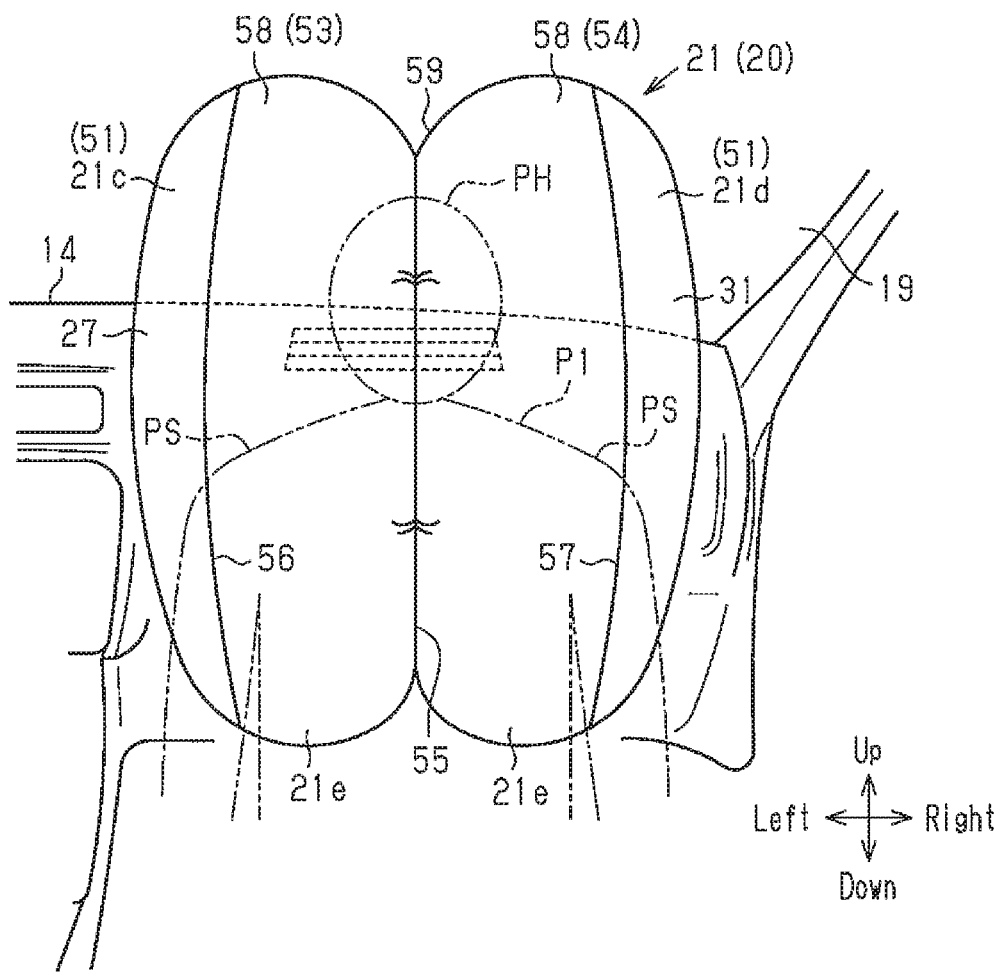
FIG. 12 is a schematic front view of the deployed and inflated bag body of the embodiment as viewed from the vehicle rear side.

Thus, as shown in FIG. 12, when the occupant P1, whose body acts to lean forward, comes into contact with the deployed and inflated bag body 21, the right and left protrusions 58 of the occupant protection section 51, which protrude rearward, first receive the right and left shoulders PS of the occupant P1. This reduces the kinetic energy of the occupant P1 who is leaning forward.

The forward tilting of the head PH of the occupant P1, whose shoulders PS are restrained by the protrusions 58, ceases as the head PH wedges into the recess 59. As such, the head PH of the occupant P1 is received softly with the reduced reactive force from the bag body 21.

As shown in FIG. 13, the instrument panel 14 has the oblique section 14a, which is oblique to the vehicle width direction. The bag body 21, which is supported by the oblique section 14a, starts to be deployed and inflated obliquely to the front-rear direction.

However, as shown in FIGS. 8A to 8C, the bag body 21 of the present embodiment has the support inflation section 45 in the assembled panel 41. Some of the inflation gas G1 fed into the bag body 21 flows into the support inflation section 45. As shown in FIG. 2, when the bag body 21 is deployed and inflated, the inflation gas G1 entering the support inflation section 45 causes the support inflation section 45 to protrude outward of the bag body 21 further than the other sections of the assembled panel 41 so as to be in contact with the instrument panel 14. As shown in FIG. 13, the bag body 21 is therefore deployed and inflated rearward without being oblique to the front-rear direction. The central section in the vehicle width direction of the rear end of the bag body 21, that is, the recess 59, is located in front of the occupant P1 and is thus capable of properly receiving the occupant P1.

If the edges of the fabric pieces 42 and 43 and the peripheral edge joint section 44 have sharp corners in the boundary sections between the protrusions 42b and 43b and the general sections 42a and 43a, the stress resulting from the pressure of the inflation gas G1 tends to concentrate on the boundary sections. This may reduce the strength.

In this respect, as shown in FIGS. 8A to 8C, the edges of the fabric pieces 42 and 43 and the peripheral edge joint section 44 of the present embodiment are curved in the boundary sections between the protrusions 42b and 43b and the general sections 42a and 43a. This disperses the stress acting on the boundary sections due to the pressure of the inflation gas G1. The curved boundary sections provide a strength that is high enough to properly deploy the airbag without causing any damage or other problems.

The above-described embodiment may be modified as follows.

In addition to or instead of the left panel 27 of the peripheral wall panel section 26, the right panel 31 may be constituted by a plurality of fabric pieces, and edges of adjacent fabric pieces may be joined by a peripheral edge joint section to constitute an assembled panel 41.

The embodiment described above, in which the assembled panel 41 is constituted by two fabric pieces 42 and 43, may include a plurality of support inflation sections 45.

The assembled panel 41 may be constituted by three or more fabric pieces. In this case, one support inflation section may be formed between every two fabric pieces that are adjacent to each other, so that the assembled panel 41 includes a plurality of support inflation sections in total.

Alternatively, a plurality of support inflation sections may be formed between adjacent fabric pieces, so that the assembled panel 41 includes a plurality of support inflation sections in total.

Figure 14:
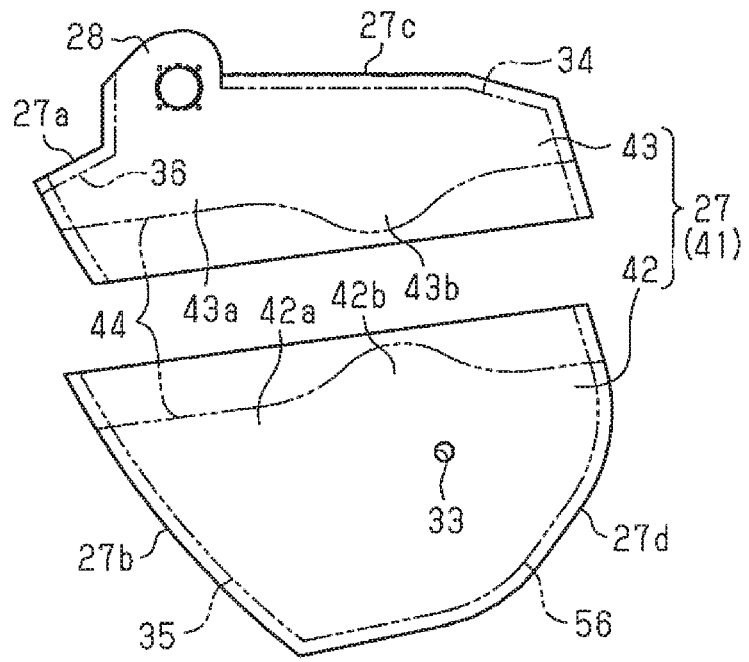
FIG. 14 is a developed view corresponding to FIG. 8A and showing a modification of fabric pieces constituting an assembled panel.
Figure 15:
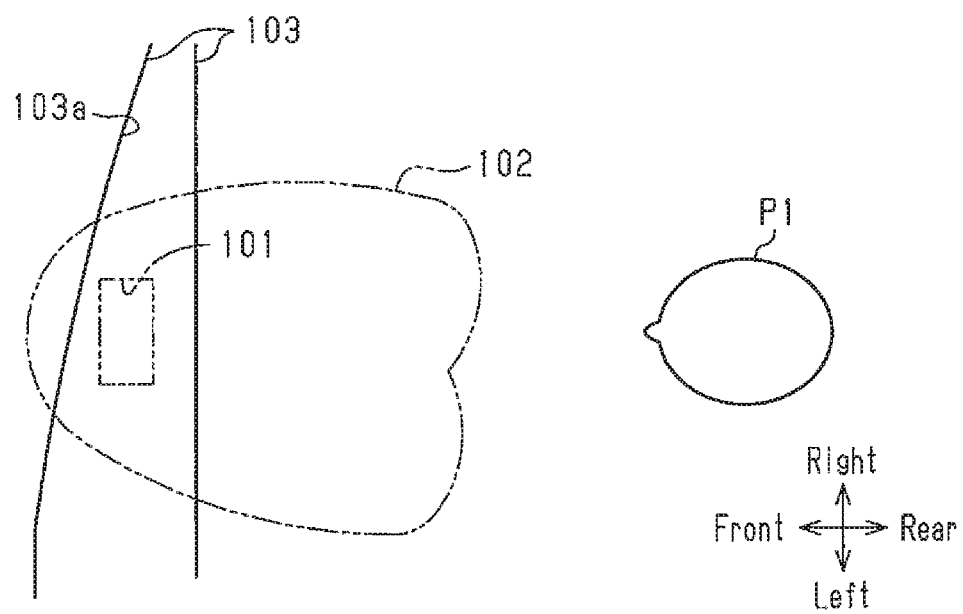
FIG. 15 is a schematic plan view of a conventional art, illustrating the relationship between an instrument panel and a bag body.

The peripheral edge joint section 44 may be of any configuration that joins the fabric pieces 42 and 43 together to constitute the assembled panel 41. As shown in FIG. 14, the peripheral edge joint section 44 may be shaped so as not to extend along edges of the fabric pieces 42 and 43, unlike the embodiment described above, in which the peripheral edge joint section 44 extends along edges of the fabric pieces 42 and 43. That is, the shape of the peripheral edge joint section 44 may be significantly different from the shape of the edges of the fabric pieces 42 and 43. In this case, although the peripheral edge joint section 44 does not extend along the edges of the fabric pieces 42 and 43, the protrusions 42b and 43b and thus the support inflation section 45 are formed.

The position and size of the support inflation section 45 are preferably set according to the length and inclination angle, for example, of the oblique section 14a of the instrument panel 14.

The joint sections 76 and 78 and the peripheral edge joint sections 34 to 36, 44 and 55 to 57 may be formed by means other than the sewing with sewing thread, such as adhesion using an adhesive.

The structure of the bag body 21 may be modified. For example, at least one of the flow guide fabric 61 and the reinforcement fabric 68 may be omitted.

In addition to or instead of the tether 71, a transverse tether extending in the vehicle width direction may bridge the left panel 27 and the right panel 31. The transverse tether is tensioned in the vehicle width direction as the bag body 21 is deployed and inflated, thereby holding the shape of the bag body 21 in the vehicle width direction.

Inflators 17 may be placed at different positions in the bag body 21.

The vehicle airbag apparatus 16 may be used for a vehicle airbag that protects not only the occupant P1 sitting in the front passenger seat 13 but also the occupant sitting in the driver's seat and the occupant sitting in the center of a triple seat from an impact.

The vehicle airbag is applicable to various industrial vehicles in addition to passenger cars.

The invention claimed is:

1. A vehicle airbag apparatus comprising an airbag configured to be installed in a storage section of an instrument panel located in front of a front seat in a vehicle, wherein
the airbag includes a bag body, into which inflation gas is fed in response to an impact applied to the vehicle,
the bag body is caused, by the inflation gas, to exit the instrument panel with a part of the bag body remaining in the storage section to be deployed and inflated rearward, and receives an occupant sitting in the front seat,
a part of the bag body is constituted by a peripheral wall panel section, which includes a pair of panels arranged in a vehicle width direction,
at least one of the panels of the peripheral wall panel section constitutes an assembled panel, which is constituted by a plurality of fabric pieces, adjacent ones of the fabric pieces being joined by a peripheral edge joint section,
the assembled panel includes a support inflation section that is configured to, when the bag body is deployed and inflated, project outward of the bag body further than other sections of the assembled panel so as to be in contact with the instrument panel, and
the support inflation section is constituted by a part of the peripheral edge joint section and a part of each of the two fabric pieces that are joined by the peripheral edge joint section.

2. The vehicle airbag apparatus according to claim 1, wherein
of the fabric pieces of the assembled panel, the two fabric pieces constituting the support inflation section each include a general section and a protrusion protruding from an edge of the general section,
the peripheral edge joint section extends along the edges of the general sections and edges of the protrusions, and
the support inflation section is constituted by the protrusions of the two fabric pieces and a part of the peripheral edge joint section that extends along the edges of the protrusions.

3. The vehicle airbag apparatus according to claim 2, wherein the peripheral edge joint section is constituted by sewing thread that joins edges of adjacent ones of the fabric pieces.

4. The vehicle airbag apparatus according to claim 3, wherein the edges of the fabric pieces and the peripheral edge joint section are curved in boundary sections between the protrusions and the general sections.

* * * * *